D. COMFORT.
TRUCK FOR TRANSPORTING HEAVY FLOWER POTS.
APPLICATION FILED MAR. 17, 1917.
1,254,778. Patented Jan. 29, 1918.
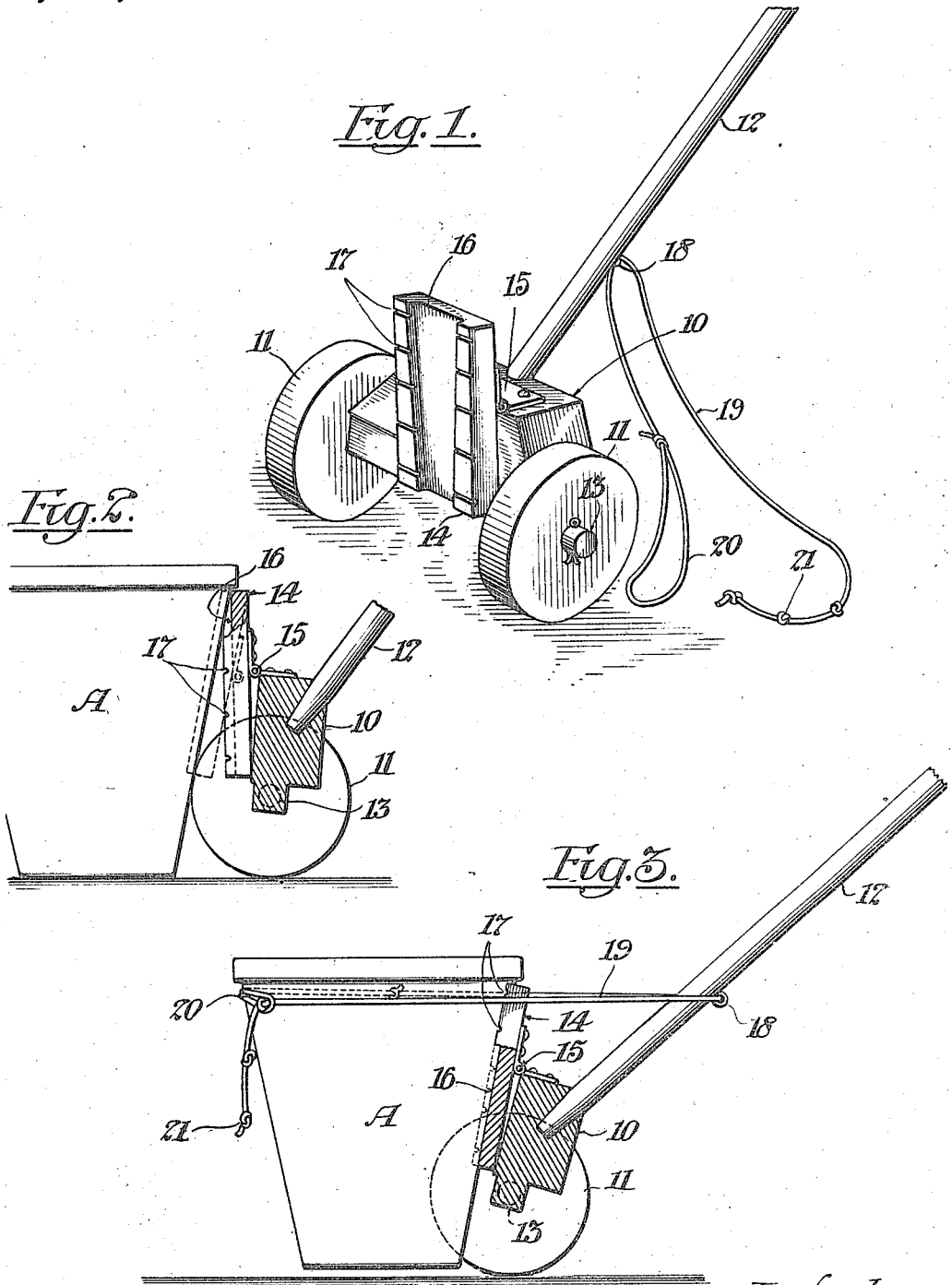
Inventor
David Comfort
by his Attorney
John R. Nolan

UNITED STATES PATENT OFFICE.

DAVID COMFORT, OF THOMASVILLE, GEORGIA.

TRUCK FOR TRANSPORTING HEAVY FLOWER-POTS.

1,254,778.

Specification of Letters Patent.

Patented Jan. 29, 1918.

Application filed March 17, 1917. Serial No. 155,465.

*To all whom it may concern:*

Be it known that I, DAVID COMFORT, a citizen of the United States, and resident of Thomasville, in the county of Thomas and State of Georgia, have invented certain new and useful Improvements in Trucks for Transporting Heavy Flower-Pots, of which the following is a specification.

The object of my invention is to provide a hand truck of simple and efficient construction and operation whereby heavy flower pots and their contents can be transported with facility from one point to another on the floor of a room, hall or apartment.

To this end the invention, generally stated, comprises a wheeled structure having at its forward end an upright vibratory clamp member and a flexible binder so constructed and correlated that a flower pot can be readily and securely loaded and bound on the structure, and can be as readily released and removed therefrom.

The invention also comprises various novel features of construction and combinations of parts which will be hereinafter described and claimed.

In the drawings—

Figure 1 is a perspective view of a flower pot truck embodying the principle of my invention.

Fig. 2 is a longitudinal vertical section of the wheeled body of the truck and adjuncts, showing in full lines the relative positions of the parts just as the upper end of the vibratory clamp member impinges against the inclined wall of a flower pot which is about to be transported, and showing in dotted lines the position assumed by such member against the wall of the pot when the truck is further advanced.

Fig. 3 is a similar section, showing the relative positions of the parts when the pot is bound on the truck and lifted from the floor preparatory to transportation.

Referring to the drawings, 10 designates an axle body borne by a pair of wheels 11 and provided with an upwardly inclined handle 12. In the present instance this body comprises a wooden block of appropriate size and shape having formed on its respective ends studs or trunnions 13 upon which the wheels are rotatably mounted, and the handle comprises a pole of convenient length having its lower end tightly, though detachably, fitted in a suitably-disposed inclined socket in the body portion.

The body 10 extends somewhat above the axis of the carrying wheels and bears at its upper forward corner an upright lever-like clamping shoe 14. This shoe preferably comprises a wooden bar which is affixed at a point between its upper and lower ends to one leaf of a hinge 15, whereof the other leaf is secured to the top of the axle body. The lower member of the shoe is somewhat longer and, therefore, heavier than the upper member thereof, thus tending to maintain the shoe normally in a vertical position, or substantially so. The forward face of the bar has throughout its length a channel 16, preferably tapering from top to bottom in conformity with the peripheral contour of a flower pot, the side portions of the channel having therein a series of spaced transverse saw cuts or kerfs 17 for a purpose which will presently appear.

To a screw eye 18, or other suitable device adequately secured to the handle 12 at a point thereon somewhat above the axle body, is affixed a rope 19, or similar flexible binder, of proper length, one end portion of which rope is in the form of an extended loop 20 and the other end portion is conveniently provided with a series of spaced apart knots 21, any one of which may be engaged with the bight of the loop when the knotted end is passed through the latter and brought under tension.

To use the truck structure above described the inclined handle thereof is grasped at its outer end and the structure is bodily pushed toward and against the inclined wall of the flower pot (A) which is to be transported. The upper extremity of the outer face of the clamp shoe impinges against the inclined wall of the pot, (as indicated by full lines in Fig. 2) and such shoe is thus bodily swung on its fulcrum so as to position the channeled face of the shoe in parallelism with and closely against the opposing wall, (as indicated by dotted lines in Fig. 2) irrespective of the diameter of the pot or the angularity of the wall, the saw cut sides of the tapering channel thus closely hugging the tapering exterior of the pot. The ends of the rope 19 are then brought around the body of the pot, and the knotted portion is passed through the looped portion of the rope and drawn taut until one of the knots is engaged by the bight of the loop. This being done the pot is firmly bound against the channeled face of the shoe, the numerous saw-cut portions of which increase the gripping action on the wall of the pot and thus contribute to the effectiveness of the clamp. The operator then presses the handle slightly downward, thus with little effort, by virtue of the resulting leverage, raising the heavy pot bodily from the floor. When the pot is lifted the rope embracing the same is caused to stretch slightly and the lower end of the clamp shoe abuts against and is limited in its swinging movement by the opposing side of the axle body, as seen in Fig. 3. The pot is thus securely held in a substantially upright position above the floor, and can therefore be readily wheeled to any desired point. There it can be deposited without shock or jar by suitably elevating the handle. The rope may then be removed from the pot by disengaging the knotted portion of the rope from the loop.

The apparatus above described is cheap, simple and durable in construction, and it well subserves the purpose for which it is designed.

I do not limit myself to the details of construction herein shown and described, as structural changes in the apparatus may be made without departing from my invention as defined in the appended claims.

I claim—

1. A truck of the character described, comprising a body portion, carrying wheels therefor, a handle projecting from the body portion, an upright clamp shoe arranged at the front of the said portion and pivoted thereto at a point above the axis of the wheels, whereby when the truck is moved toward a flower pot the upper portion of the shoe impinges against the inclined wall of the pot and the shoe is bodily tilted to cause its outer face to coincide with the angle of the wall, and a flexible binder on the handle adapted to be passed around the body of the pot.

2. An apparatus of the character described, comprising a body portion, carrying wheels therefor, a handle projecting from the body portion, an upright clamp shoe arranged at the front of said portion and pivoted thereto at a point above the axis of the wheels, whereby when the truck is moved toward a flower pot the upper portion of the shoe impinges against the inclined wall of the pot and the shoe is bodily tilted to cause its outer face to coincide with the angle of the wall, said outer face having a longitudinal channel therein, and a flexible binder on the handle adapted to be passed around the body of the pot.

3. An apparatus of the character described, comprising a body portion, carrying wheels therefor, a handle projecting from the body portion, an upright clamp shoe arranged at the front of said portion and pivoted thereto at a point above the axis of the wheels, said shoe having a longitudinally channeled outer face and the side walls of the channel having a series of transverse cuts or kerfs therein, and a flexible binder on the handle.

4. An apparatus of the character described, comprising a body portion, carrying wheels therefor, a handle projecting from the body portion, an upright clamp shoe arranged at the front of said portion and pivoted thereto at a point above the axis of the wheels, said shoe having in its outer face a longitudinal tapering channel, and a flexible binder on the handle.

5. An apparatus of the character described, comprising a body portion, carrying wheels therefor, a handle projecting from the body portion, an upright clamp shoe arranged at the front of the said portion and pivoted thereto at a point above the axis of the wheels, and a flexible binder secured between its ends to the handle, one portion of said binder having a loop and the other portion having a series of spaced knots.

6. An apparatus of the character described, comprising a body portion, carrying wheels therefor, a handle projecting from the body portion, an upright clamp lever at the front of said portion, a hinge connection between said lever and body portion, the lower member of said lever being heavier than the upper member thereof and being movable from and against the outer side of the body portion, and a flexible binder on the handle.

Signed at Thomasville, in the county of Thomas and State of Georgia, this 1st day of March, A. D. 1917.

DAVID COMFORT.

Copies of this patent may be obtained for five cents each, by addressing the "Commissioner of Patents, Washington, D. C."